United States Patent
Desbiens (10) Patent No.: US 7,876,497 B2
(45) Date of Patent: Jan. 25, 2011

(54) MULTI-STAGE LONG-BAND OPTICAL AMPLIFIER WITH ASE RE-USE

(75) Inventor: Louis Desbiens, Saint-Augustin-de-Desmaures (CA)

(73) Assignee: Institut National D'Optique, Québec, (QC) (CA)

(*) Notice: Subject to any disclaimer, the term of this patent is extended or adjusted under 35 U.S.C. 154(b) by 245 days.

(21) Appl. No.: 12/117,852

(22) Filed: May 9, 2008

(65) Prior Publication Data
US 2009/0279166 A1 Nov. 12, 2009

(51) Int. Cl.
*H04B 10/17* (2006.01)
*H04B 10/12* (2006.01)

(52) U.S. Cl. .............. 359/341.33; 359/333; 359/341.32

(58) Field of Classification Search .......... 359/341.33, 359/333, 341.32
See application file for complete search history.

(56) References Cited

U.S. PATENT DOCUMENTS

| | | | | |
|---|---|---|---|---|
| 5,136,420 | A * | 8/1992 | Inagaki et al. ............. | 359/341.3 |
| 5,930,030 | A * | 7/1999 | Scifres ...................... | 359/341.3 |
| 6,104,527 | A | 8/2000 | Yang | |
| 6,222,670 | B1 | 4/2001 | Ryu et al. | |
| 6,233,092 | B1 | 5/2001 | Flood et al. | |
| 6,317,254 | B1 | 11/2001 | Park et al. | |
| 6,330,384 | B1 | 12/2001 | Ryu et al. | |
| 6,437,907 | B1 * | 8/2002 | Yoon et al. ............. | 359/341.32 |
| 6,504,647 | B1 | 1/2003 | Shigematsu | |
| 6,570,701 | B1 * | 5/2003 | Hwang et al. ............ | 359/341.1 |
| 6,731,426 | B2 * | 5/2004 | Yeniay et al. .......... | 359/341.32 |
| 7,027,218 | B2 * | 4/2006 | Hwang et al. ........... | 359/341.5 |
| 7,081,989 | B2 * | 7/2006 | Song et al. ............. | 359/341.32 |
| 7,289,263 | B1 | 10/2007 | Starodoumov et al. | |
| 2003/0058526 | A1 * | 3/2003 | Kakui ....................... | 359/341.3 |
| 2003/0133183 | A1 * | 7/2003 | Yeniay et al. ............ | 359/349 |
| 2004/0212873 | A1 * | 10/2004 | Hwang et al. ............. | 359/333 |
| 2004/0233517 | A1 * | 11/2004 | Song et al. ............... | 359/349 |

(Continued)

FOREIGN PATENT DOCUMENTS

WO    WO 03088433 A1 * 10/2003

OTHER PUBLICATIONS

Mahdi et al., "Gain Enhanced L-Band Er3+-Doped Fiber Amplifier Utilizing Unwanted Backward ASE", IEEE Photonics Technology Letters, vol. 13, No. 10, pp. 1067-1069, (Oct. 2001).*

(Continued)

*Primary Examiner*—Eric Bolda
(74) *Attorney, Agent, or Firm*—Ogilvy Renault, LLP (57) ABSTRACT

There is provided a long-band rare-earth-doped optical amplifier and method for amplifying an optical signal. The optical amplifier has a pre-, a mid- and a post-amplification stage. Only the mid-amplification stage is pumped with a pump light source. The other two are pumped using Amplified Spontaneous Emission (ASE) generated in the mid-amplification stage. An optical coupling device is used to couple the three amplification stages together and to split the ASE generated in the mid-amplification stage and available at one end of the mid-amplification stage. One part of the split ASE is used to pump the pre-amplification stage while the other part is used to pump the post-amplification stage.

20 Claims, 12 Drawing Sheets

U.S. PATENT DOCUMENTS

2005/0225845 A1* 10/2005 Pegg .................. 359/341.1
2006/0082865 A1* 4/2006 Ahn et al. ................ 359/333

OTHER PUBLICATIONS

J. Lee, U. Ryu, S. J. Ahn and N. Park, "Enhancement of power conversion efficiency for an L-band EDFA with a secondary pumping effect in the unpumped EDF section", IEEE photonics Technology Letters, 11, 1, 1999 (42-44).

J. H. Lee, U. Ryu, N. Park, "Passive erbium-doped fiber seed photon generator for high-power Er3+-doped fiber fluorescent sources with an 80-nm bandwidth", Optics letters, 24, 5, 1999 (279-281).

J.F Massicott et al., "Low noise operation of Er3+ doped silica fibre amplifier around 1.6 µm", Electronics Letters, 28, 20, 1992 (1924-1925).

B. Min, H Yoon, W.J. Lee, N. Park, "Coupled structure for wide-band EDFA with gain and noise figure improvements from C to L-band ASE injection", IEEE phot. Tech. Let., 12, 5, 2000 (480-482).

M. Shigematsu, M. Kakui, S. Ishikawa et M. Nishimura, "A novel configuration of L-band erbium-doped fiber amplifier for improved efficiency", Proceedings of ECOC '99, Sep. 26-30, 1999, Nice, France (I 270-I 271).

* cited by examiner

MULTI-STAGE LONG-BAND OPTICAL AMPLIFIER WITH ASE RE-USE

TECHNICAL FIELD

The present relates to multi-stage optical amplifiers, and more specifically to multi-stage long-band single-pass rare-earth-doped optical amplifiers using amplified spontaneous emission generated in one amplification stage to pump another amplification stage.

BACKGROUND OF THE ART

Single-pass optical fiber amplifiers consist of a length of rare-earth doped optical fiber in which the optical signal to be amplified is propagated. An optical coupler is used to couple a pump light in the rare-earth-doped optical fiber to pump the rare-earth-doped medium. The signal may either co-propagate or counter-propagate with the pump light, or the rare-earth-doped fiber may be pumped from both sides. Isolators are typically placed at both ends of the rare-earth-doped optical fiber.

Long-band optical amplifiers are amplifiers used to amplify a signal with a wavelength that is offset from the peak of the emission cross-section of the rare-earth dopant used. For example, long-band erbium-doped amplifiers are used to amplify optical signals in the L-band, i.e. 1570 nm to 1620 nm, while erbium has a peak emission at about 1530 nm. In another example, long-band ytterbium-doped amplifiers are used to amplify optical signals with wavelengths of 1064 nm and above while the ytterbium peak emission is at about 1030 nm.

Long-band amplifiers typically uses absorption of Amplified Spontaneous Emission (ASE) generated in the rare-earth-doped fiber as a result of pumping to further enhance the gain at the wavelength of the optical signal to be amplified. This principle usually requires a relatively long length of rare-earth-doped fiber since the absorption cross section at the ASE peak emission is quite lower than the absorption cross section at the pump wavelength. U.S. Pat. No. 6,222,670 to Ryu et al. and U.S. Pat. No. 6,233,092 to Flood et al. teach long-band amplifier architectures that uses ASE generated in one amplification stage as a result of traditional pumping, to pump another amplification stage.

SUMMARY

According to one aspect, there is provided a long-band optical amplifier and method that uses a polarization-maintaining rare-earth-doped optical waveguide wherein the optical signal to be amplified is polarized along one principal state of polarization of the optical waveguide. An optical coupling device, i.e. a polarization combiner/splitter, uses the polarization to split the ASE produced in a mid-amplification stage in a first and a second part of ASE, used respectively to pump a pre- and a post-amplification stage, thereby offering an efficient use of the pump power in the long-band optical amplifier and a good noise figure.

By using a polarizer at the output of the long-band optical amplifier, only the ASE generated in the polarization state of the optical signal is kept, all other ASE being suppressed, thereby improving the noise figure of the amplifier.

A polarization-maintaining fiber coupler may be used as the optical coupling device, providing a simple amplification architecture.

According to another aspect, there is provided an long-band rare-earth-doped optical amplifier and method for amplifying an optical signal. The optical amplifier has a pre-, a mid- and a post-amplification stage. Only the mid-amplification stage is pumped with a pump light source. The other two are pumped using ASE generated in the mid-amplification stage. An optical coupling device is used to couple the three amplification stages together and to split the ASE generated in the mid-amplification stage and available at one end of the mid-amplification stage. One part of the split ASE is used to pump the pre-amplification stage while the other part is used to pump the post-amplification stage.

In one embodiment, the optical amplifier uses polarization-maintaining optical waveguides and the optical signal is polarized along one of the principal polarization axis of the waveguides. The optical coupling device may then use a polarization combiner/splitter to split the ASE between the pre- and the post-amplification stage while not splitting the optical signal.

According to another aspect, there is provided a method for amplifying an optical signal in a long-band optical amplifier. The method comprises: (1) propagating the optical signal in a first rare-earth-doped amplification waveguide and in a second rare-earth-doped amplification waveguide; (2) pumping the second rare-earth-doped amplification waveguide with a pump light source to amplify the optical signal propagating in the pumped second rare-earth-doped amplification waveguide into an amplified optical signal, the pumping generating amplified spontaneous emission in the second rare-earth-doped amplification waveguide; (3) splitting the amplified spontaneous emission in at least a first and a second part of amplified spontaneous emission; (4) coupling the first part in the first rare-earth-doped amplification waveguide for pumping the first rare-earth-doped amplification waveguide to pre-amplify the optical signal propagating therein; and (5) coupling the amplified optical signal and the second part in a third rare-earth-doped amplification waveguide, the second part pumping the third rare-earth-doped amplification waveguide for post-amplification of the amplified optical signal.

According to another aspect, there is provided an optical amplifier for amplifying an optical signal in a long-band of the optical amplifier. The optical amplifier comprises a pre-amplification stage, a mid-amplification stage and a post-amplification stage. The pre-amplification stage has a first rare-earth-doped amplification waveguide. The optical signal is to be coupled at an input of the first rare-earth-doped amplification waveguide for pre-amplification of the optical signal. The mid-amplification stage has a second rare-earth-doped amplification waveguide pumped with a pump light source for mid-amplification of the optical signal. The mid-amplification generates amplified spontaneous emission in the second rare-earth-doped amplification waveguide. The post-amplification stage has a third rare-earth-doped amplification waveguide for post-amplification of the optical signal. The optical amplifier further comprising an optical coupling device connected between the pre-amplification stage, the mid-amplification stage and the post-amplification stage for coupling the optical signal received from the pre-amplification stage to the mid-amplification stage, and from the mid-amplification stage to the post-amplification stage. The optical coupling device receives the amplified spontaneous emission from the mid-amplification stage, and splits it in a first and a second part such that the first part is coupled to the pre-amplification stage for pumping the pre-amplification stage, and the second part is coupled to the post-amplification stage for pumping the post-amplification stage.

According to another aspect, there is provided an optical amplifier for amplifying an optical signal in a long-band of the optical amplifier. The optical amplifier comprises a pre-amplification stage, a mid-amplification stage and a post-amplification stage. The pre-amplification stage has a first rare-earth-doped amplification waveguide. The optical signal is to be coupled at an input of the first rare-earth-doped amplification waveguide for pre-amplification of the optical signal. The mid-amplification stage has a second rare-earth-doped amplification waveguide pumped with a pump light source for mid-amplification of the optical signal. The mid-amplification generates amplified spontaneous emission in the second rare-earth-doped amplification waveguide. The post-amplification stage has a third rare-earth-doped amplification waveguide for post-amplification of the optical signal. The optical amplifier further comprises an optical coupling device for coupling the pre-, mid- and post-amplification stages. The optical coupling device has (1) a first port connected to an output of the pre-amplification stage and a third port connected to an input of the mid-amplification stage for coupling the optical signal received from the pre-amplification stage to the mid-amplification stage, and (2) a second port connected to an output of the mid-amplification stage and a fourth port connected to an input of the post-amplification stage for coupling the optical received from the mid-amplification stage to the post-amplification stage; (3) the optical coupling device interconnecting the first, second, third and fourth ports so as to split the amplified spontaneous emission received on at least one of the second and the third port, in a first and a second part respectively to the first and the fourth port, such that the first part is coupled to the pre-amplification stage for pumping the pre-amplification stage, and the second part is coupled to the post-amplification stage for pumping the post-amplification stage.

BRIEF DESCRIPTION OF THE DRAWINGS

It will be noted that throughout the appended drawings, like features are identified by like reference numerals.

DETAILED DESCRIPTION

Figure 1:
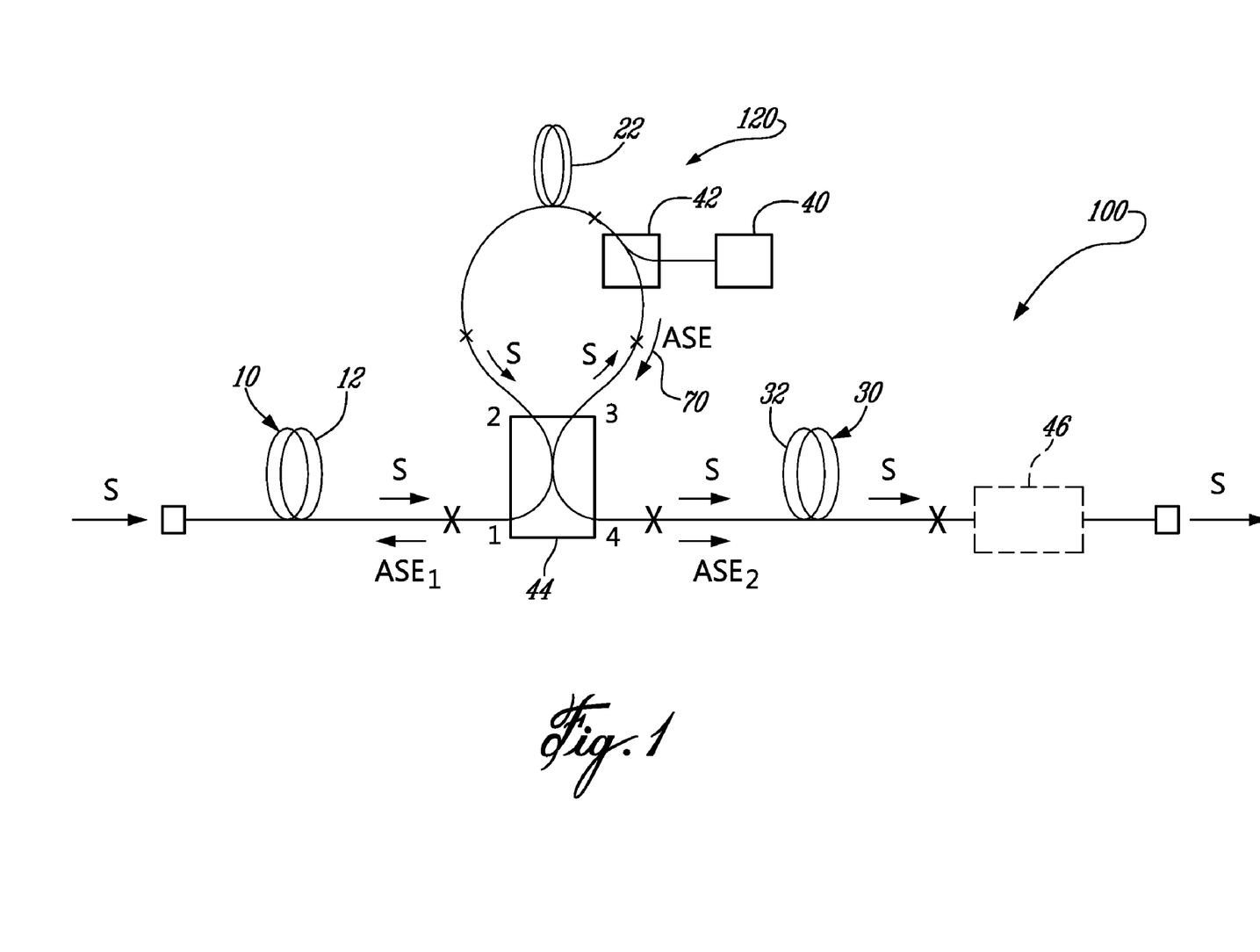
FIG. 1 is a block diagram illustrating an embodiment of a long-band optical amplifier wherein a polarization-maintaining fiber coupler is used and wherein the mid-amplification stage is pumped in co-propagation.

Now referring to the drawings, FIG. 1 shows an embodiment of a long-band optical fiber amplifier 100 which is based on the re-use of ASE generated in one amplification stage to pump other amplification stages. The optical amplifier 100 comprises three single-pass amplification stages, i.e. a pre-amplification stage 10, a mid-amplification stage 120 and a post-amplification stage 30. Each amplification stage 10, 120 and 30 uses a rare-earth doped optical fiber 12, 22, 32 as the amplification medium. The rare-earth doped optical fibers 12, 22, 32 are polarization-maintaining fibers.

The optical signal s to be amplified is coupled to the input of the pre-amplification stage 10 for pre-amplification. The optical signal s is polarized along one of the principal states of polarization, in this case the fast axis, of the polarization-maintaining fibers 12, 22, 32 and this polarization state is maintained throughout the amplification stages 10, 120 and 30. The output of the pre-amplification stage 10 is connected to the input of mid-amplification stage 120 through an optical coupling device, in this case a polarization-maintaining fiber coupler 44. The output of the pre-amplification stage 10 is connected to port 1 of the coupler 44 and the input of the mid-amplification stage 120 is connected to port 3 of the coupler 44, such that the optical signal s exiting the pre-amplification stage 10 is coupled to the mid-amplification stage 120.

The mid-amplification stage 120 comprises a pump light source 40, typically a laser diode, for pumping the rare-earth-doped optical fiber 22 in order to amplify the optical signal s propagating therein. The pump light produced by the pump light source 40 is coupled into the rare-earth-doped optical fiber 22 at its input, using an optical fiber coupler, namely a wavelength division multiplexing coupler 42. The optical signal s and the pump light thereby co-propagate in the rare-earth-doped optical fiber 22. The mid-amplification stage 120 acts as a high-gain amplification stage. Then, the output of the mid-amplification stage 120 is connected to the input of the post-amplification stage 30 through the coupler 44. The output of the mid-amplification stage 120 is connected to port 2 of the coupler 44 and the input of the post-amplification stage 30 is connected to port 4 of the coupler 44, such that the optical signal s exiting the mid-amplification stage 120 is coupled to the post-amplification stage 30. The optical signal s then propagates in the post-amplification stage 30 which acts as a power amplifier.

It is noted that in FIGS. 1, 2, 4 and 5 an "x" along an optical fiber denotes a fusion splice used to connect adjoining optical fibers.

Pumping of the rare-earth-doped optical fiber 22 in the mid-amplification stage 120 generates ASE in co- and in counter-propagation with the optical signal s. Since the pump light is co-propagating with the optical signal s, most of the ASE is generated near the input of the mid-amplification stage 120 and co-propagating ASE is largely re-absorbed along the rare-earth-doped optical fiber 22. However, most of the generated counter-propagating ASE is available in counter-propagation at the input of the mid-amplification stage 120, as denoted by arrow 70. The counter-propagating ASE enters the coupler 44 on port 3. It is noted that both co- and counter-propagating ASE generated in the mid-amplification stage 120 are unpolarized. As will be explained in more detail later with reference to FIG. 3, unpolarized ASE entering the polarization-maintaining fiber coupler 44 at port 3 is split in power in a first and a second part of ASE ($ASE_1$ and $ASE_2$) respectively to port 1 and port 4. The splitting ratio is such that about 30% of the ASE at port 3 is directed to port 1, while about 70% is directed to port 4. Consequently, the first part of ASE ($ASE_1$) counter-propagates in the rare-earth-doped optical fiber 12 to act as a pump in the pre-amplification stage 10 for pre-amplification of the optical signal s. The second part of ASE ($ASE_2$) co-propagates in the rare-earth-doped optical fiber 32 and acts as a pump in the post-amplification stage 30 for power amplification of the optical signal s. A single pump light source 40 is thus required for amplification using three amplification stages.

At the output of the post-amplification stage 30, the optical signal s is still polarized along the fast axis while the residual ASE is polarized mostly along the slow axis. Optionally, the use of a polarizer 46 aligned along the fast axis and placed at the output of the post-amplification stage 30 is used to suppress ASE along the slow axis, leaving only ASE along the fast axis. This is used to reduce the noise figure of the optical amplifier 100.

It is noted that, in FIG. 1, the use of a polarization-maintaining fiber coupler 44 provides an ASE splitting ratio of about 30/70 between port 1 and 4 but this ratio can be modified by modifying the characteristics of the polarization-maintaining fiber coupler 44 in manufacture. This may be used to optimize the optical amplifier 100.

It is noted that the rare-earth element used in the doping of the rare-earth-doped optical fibers 12, 22, 32 may vary and that the optical amplifier 100 may then be used to amplify optical signals with different wavelengths. Examples of possible rare-earth elements are erbium and ytterbium. For example, if erbium is used, the long-band amplifier 100 may be used to amplify an optical signal having a wavelength between about 1565 to 1625 nm. In the following description, it will be supposed that ytterbium-doped silica optical fibers are used to amplify an optical signal at a wavelength of about 1064 nm. The emission cross-section of an ytterbium-doped silica optical fiber has a peak at about 1030 nanometers and such an optical fiber offers a maximum gain at about this wavelength when pumped at 976 nm. Amplification at 1064 nm and more is considered long-band amplification.

Figure 2:
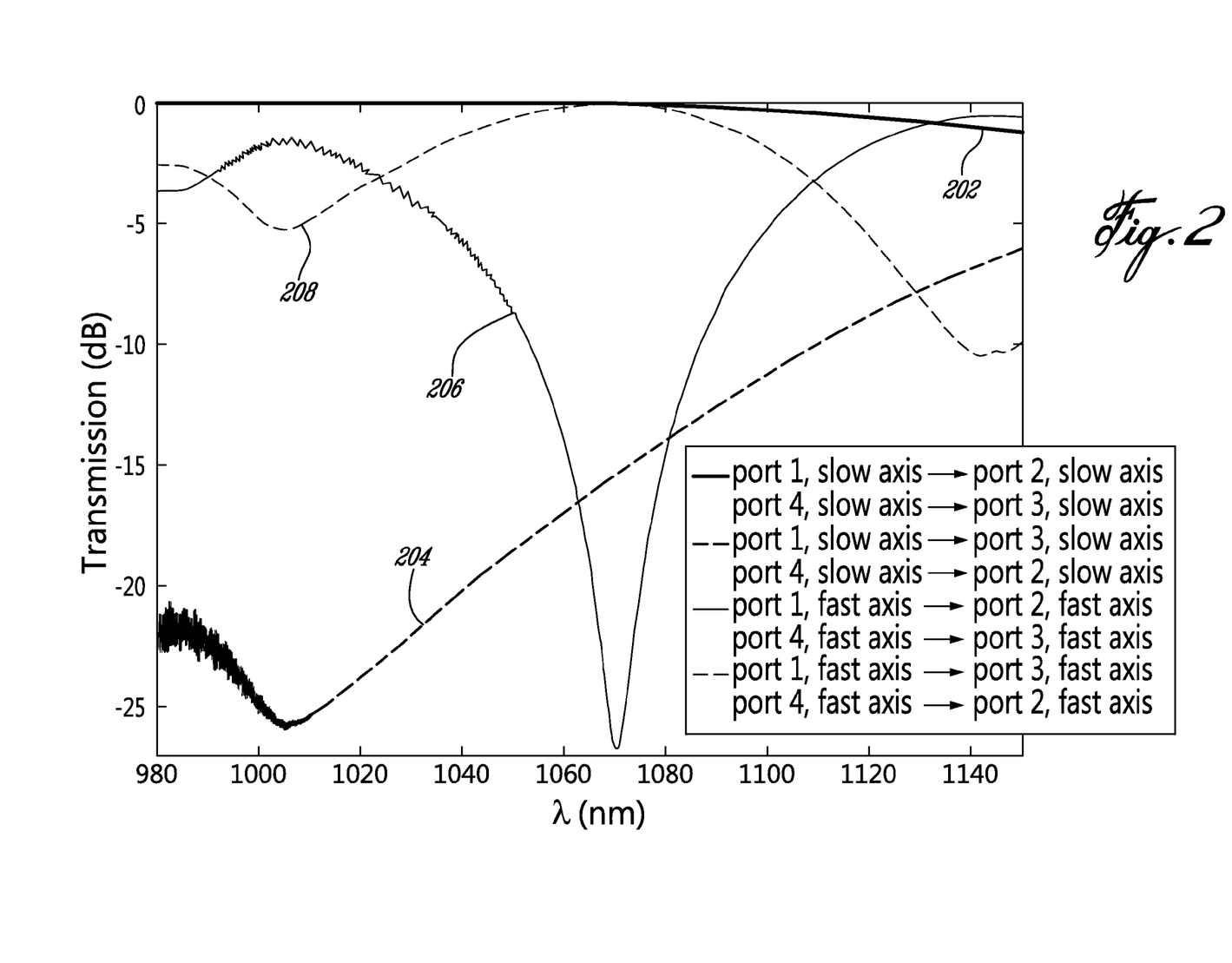
FIG. 2 is a graph showing the transmission spectrum of the example polarization-maintaining fiber coupler used in the amplifier of FIG. 1.

FIG. 2 is a graph showing the transmission spectrum of an example polarization-maintaining fiber coupler 44 used in the amplifier of FIG. 1. The polarization-maintaining fiber coupler 44 is made for optimal behavior at 1064 nm, which corresponds to the wavelength of the optical signal to be amplified in this case. Trace 202 shows the transmission spectrum between port 1 and port 2 of the coupler 44, or equivalently between port 4 and port 3, for light polarized along the slow axis. Trace 204 shows the transmission spectrum between port 1 and port 3 of the coupler 44, or equivalently between port 4 and port 2, for light polarized along the slow axis. Trace 206 shows the transmission spectrum between port 1 and port 2 of the coupler 44, or equivalently between port 4 and port 3, for light polarized along the fast axis. Trace 208 shows the transmission spectrum between port 1 and port 3 of the coupler 44, or equivalently between port 4 and port 2, for light polarized along the fast axis. In this case, the coupler 44 is a PM combiner from Gooch & Housego (formely SIFAM Fibre Optics in Torquay, UK), model # FFP-8M3264G10, based on fused fiber coupler technology.

It can be seen that light polarized along the slow axis at port 1 is mostly transmitted to port 2, regardless of the wavelength. The same is true from port 4 to port 3, from port 2 to port 1 and from port 3 to port 4. Light at and around 1064 nm and polarized along the fast axis at port 1 is mostly transmitted to port 3. The same is true from port 4 to port 2, from port 3 to port 1 and from port 2 to port 4. However, light at port 1 having a wavelength close to the 1030-nm ASE emission peak of ytterbium and polarized along the fast axis is split among ports 2 and 3, with a splitting ratio of about 50/50. The same is true from port 4 to ports 2 and 3, from port 2 to 4 and 1 and from port 3 to ports 1 and 4.

Accordingly, now referring back to FIG. 1, unpolarized counter-propagating ASE at port 3 of the coupler 44 is split with a ratio of about 30/70 between port 1 and 4. ASE transmitted to port 1 is mostly polarized along the fast axis. ASE transmitted to port 4 is mostly polarized along the slow axis. Optical signal at about 1064 nm at port 1 is transmitted to port 3 with an insertion loss of about 0.15 dB and similarly from port 2 to 4.

Figure 3:
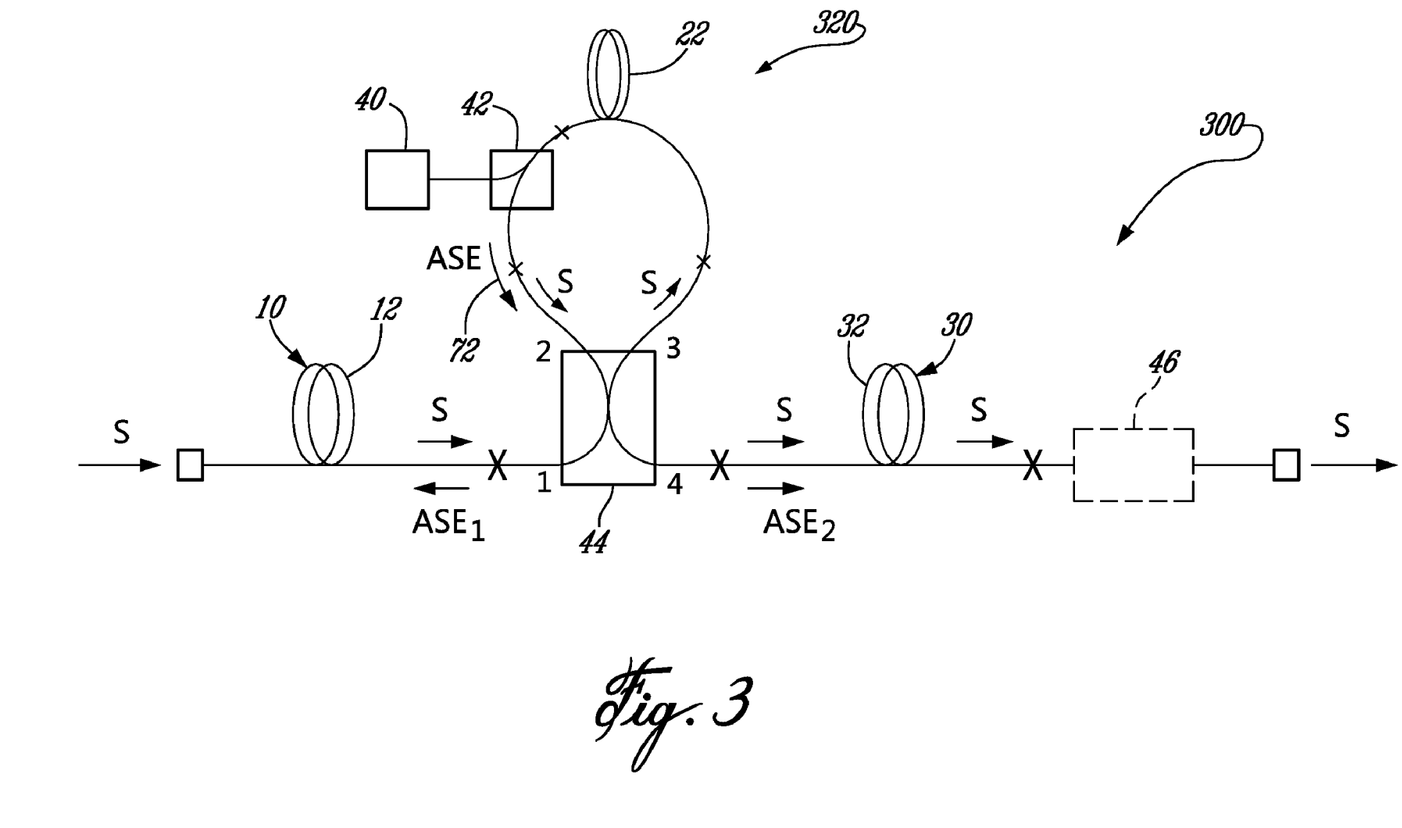
FIG. 3 is a block diagram illustrating another embodiment of a long-band optical amplifier wherein a polarization-maintaining fiber coupler is used and wherein the mid-amplification stage is pumped in counter-propagation.

FIG. 3 shows another embodiment of a long-band optical fiber amplifier 200. The optical amplifier 300 is in most points similar to the optical amplifier 100 of FIG. 1 and similar components will not be herein repetitively described. The difference between the optical amplifiers 100 and 300 lies in the pumping of the mid-amplification stage 320 of the optical amplifier 300. In this case, pumping is made in counter-propagation instead of co-propagation. The pump light source 40 and the wavelength division multiplexing coupler 42 are thus simply placed between port 2 of the coupler 44 and the output of the rare-earth-doped optical fiber 22 in order to couple pump light in counter-propagation in the rare-earth-doped optical fiber 22. Consequently, most of the ASE generated in the mid-amplification stage 320 and available for pumping the other states 10, 30 is co-propagating ASE available at the output of the mid-amplification stage 320, as denoted by arrow 72. Unpolarized ASE entering the polarization-maintaining fiber coupler 44 at port 2 is split in power in a first and a second part of ASE ($ASE_1$ and $ASE_2$) respectively to port 1 and port 4. Since the ASE enters the coupler 44 at port 2 instead of port 3, the splitting ratio is different from the one of FIG. 1. The splitting ratio is such that about 70% of the ASE at port 2 is directed to port 1, while about 30% is directed to port 4.

It is noted that the splitting ratio of FIG. 1 is typically more optimal that the one of FIG. 3 since pre-amplification typically requires less pump power that post-amplification. This is due to the fact that the post-amplification stage 30 is a power amplifier where the optical signal is powerful enough to saturate the gain. The pre-amplifier is rather a low signal amplifier and less pump power is required to generate gain. Both options are nonetheless available.

Figure 4:
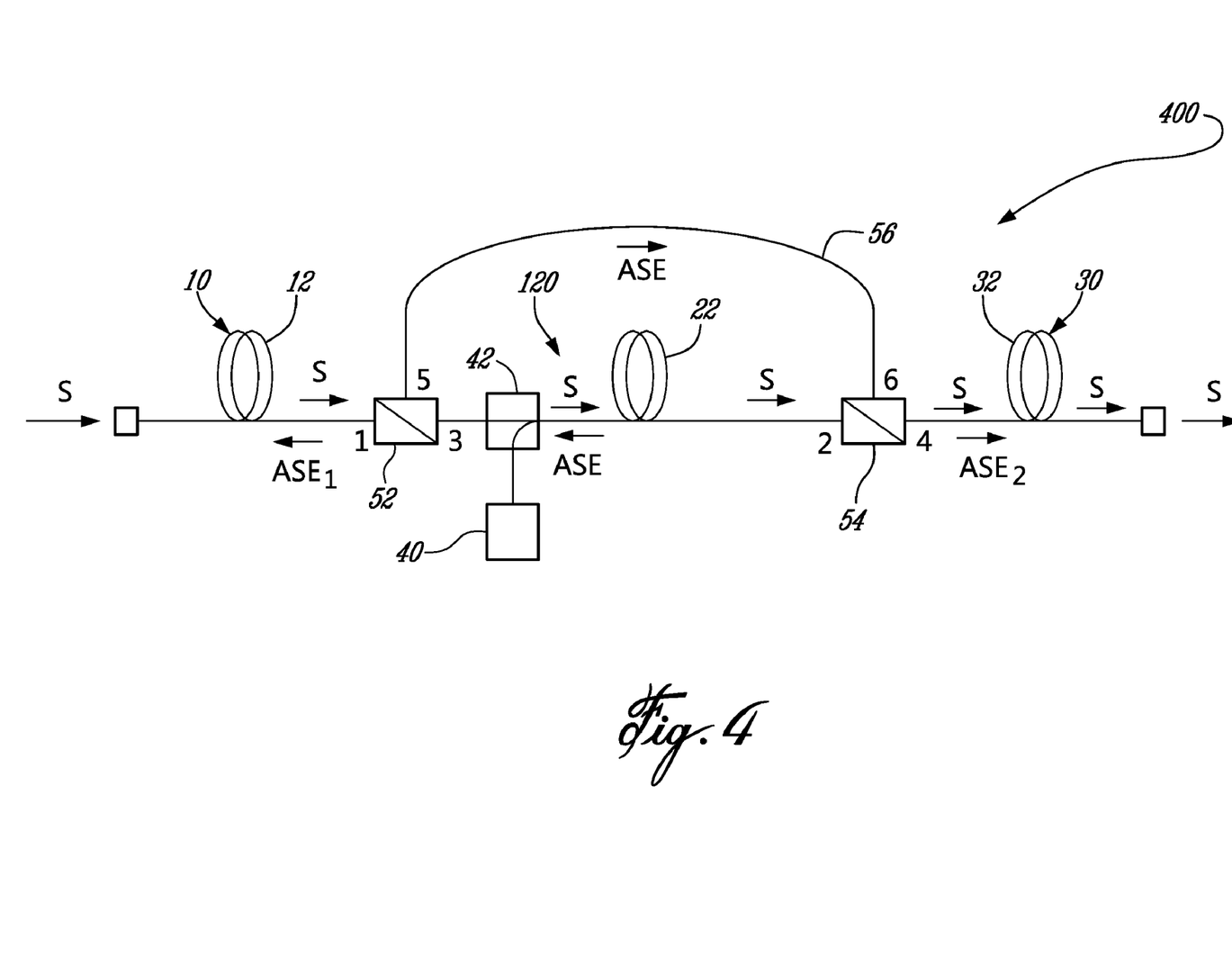
FIG. 4 is a block diagram illustrating yet another embodiment of a long-band optical amplifier wherein the polarization-maintaining fiber coupler is replaced by another optical coupling device consisting of two polarization beam combiners/splitters.

It is noted that the polarization-maintaining fiber coupler 44 of FIG. 1 may be replaced by other optical coupling devices, such as other types of polarization combiners/splitters, either fused fiber core or bulk. A suitable optical coupling device may be obtained, for example, by combining two polarization beam combiners/splitters 52 and 54 as shown in FIG. 4. The optical amplifier 400 is in most points similar to the optical amplifier 100 of FIG. 1 and similar components will not be herein repetitively described. A first fiber-pigtailed bulk polarization beam combiner/splitter 52 is placed between the pre-amplification stage 10 and the mid-amplification stage 120 and a second fiber-pigtailed bulk polarization beam combiner/splitter 52 is placed between the mid-amplification stage 120 and the post-amplification stage 30. The polarization beam combiner/splitter 52 splits counter-propagating ASE received from the mid-amplification stage 120 between the pre-amplification stage 10 and one end of an optical fiber 56 also connected to the polarization beam combiner/splitter 52. The other end of the optical fiber 56 is connected to the polarization beam combiner/splitter 54 and received ASE is transmitted to the post-amplification stage 30.

It is noted that, in this configuration where bulk polarization beam combiners/splitters are used, the counter-propagating ASE is split 50/50 between the pre- and post-amplification stages. This may not be the optimal ratio since pre-amplification typically requires less pump power than post-amplification. However the ASE at the output of the optical amplifier 400 has a significant polarization extinction ratio since bulk polarization beam combiners/splitters have a broad spectral response, and therefore the use a polarizer at the output of the optical amplifier 400 allows a significant reduction of the noise figure if the signal is co-propagating with the pump.

Figure 5:
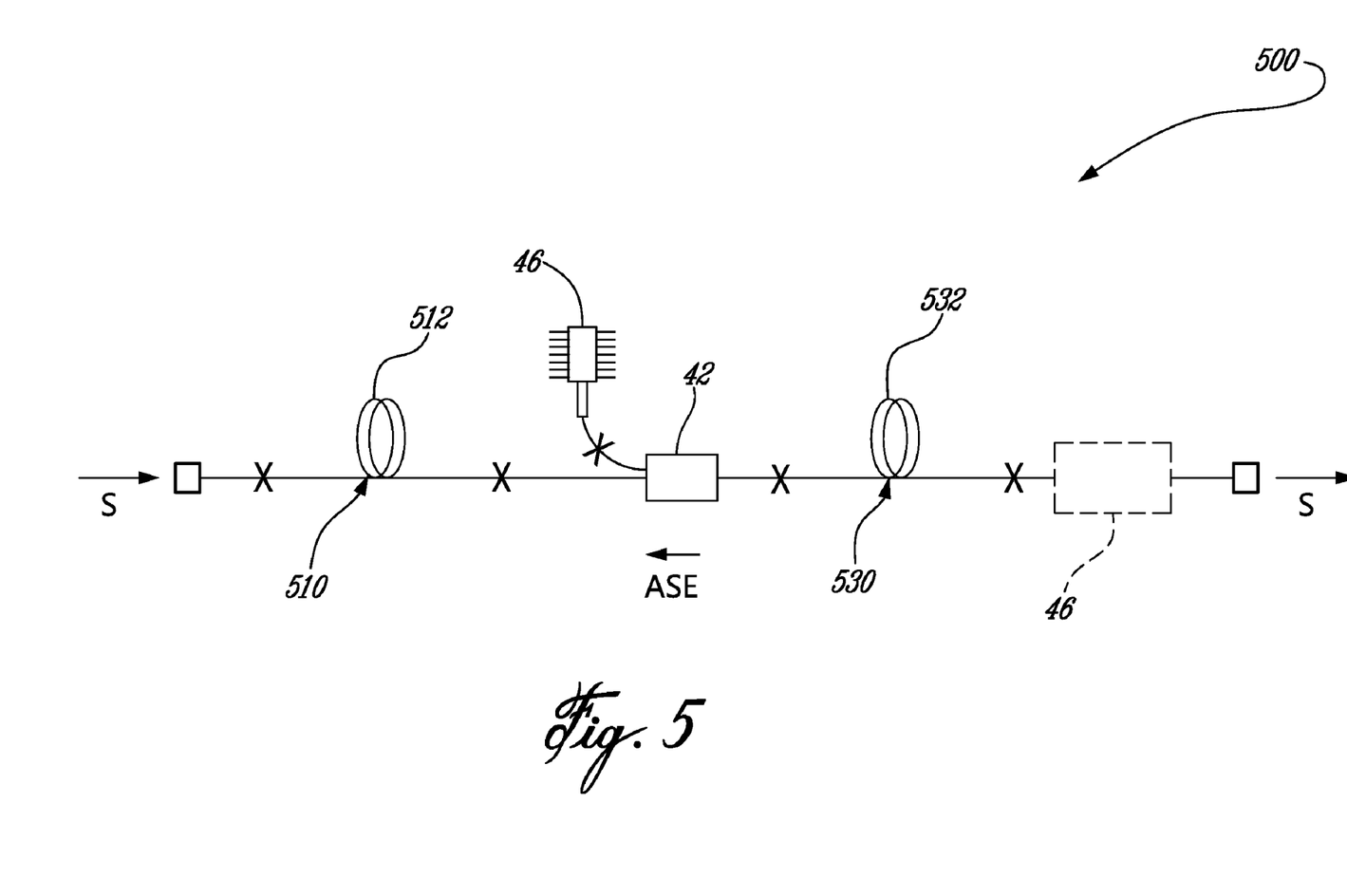
FIG. 5 is a block diagram illustrating an optical amplification architecture used as a reference for illustrating characteristics of the optical amplifier of FIG. 1.

FIGS. 6 to 9 show numerical simulations that were performed in order to show the behavior of the optical amplifier 100. The optical amplifier 100 is now compared to a reference long-band amplifier 500 which is based on an architecture that is more similar to conventional architectures. The reference optical amplifier 500 is shown in FIG. 5 and has a first amplification stage 510 consisting of a polarization-maintaining rare-earth-doped optical fiber 512, in cascade with a second amplification stage 530 consisting of a polarization-maintaining rare-earth-doped optical fiber 532 pumped in co-propagation using a pump light source 40 and a wavelength division multiplexing coupler 42. Counter-propagating ASE generated in the second amplification stage 530 is used to pump the first amplification stage 510. The optical signal is polarized and propagates along the fast axis.

More specifically, both amplifiers use a highly-ytterbium-doped polarization maintaining optical fiber of the model 529C23 manufactured at the Institut National d'Optique in Quebec City, Canada. The pump light source 40 is a laser diode pump having a power of 450 mW at 976 nm. The input power level of the optical signal s to be amplified is 200 μW at a central wavelength of 1064 nm and the optical signal s is polarized along the fast axis. The fiber lengths of each stage in each amplifier were optimized to maximize the overall gain of each amplifier. The resulting lengths are as follows: In the optical amplifier 100 of FIG. 1, the length of the first rare-earth-doped optical fiber 12 is 5.51 m, the length of the second rare-earth-doped optical fiber 22 is 4.73 m and the length of the third rare-earth-doped optical fiber 32 is 3.88 m. In the reference optical amplifier 500 of FIG. 5, the length of the first rare-earth-doped optical fiber 512 is 7.48 m and the length of the second rare-earth-doped optical fiber 532 is 5.52 m. The particular optical fiber used in this case has a numerical aperture of 0.14, a mode field diameter of 6.1 μm at 1060 nm, a theoretical cutoff wavelength of 950 nm and peak absorption at 976 nm of 530 dB/m.

Figure 6:
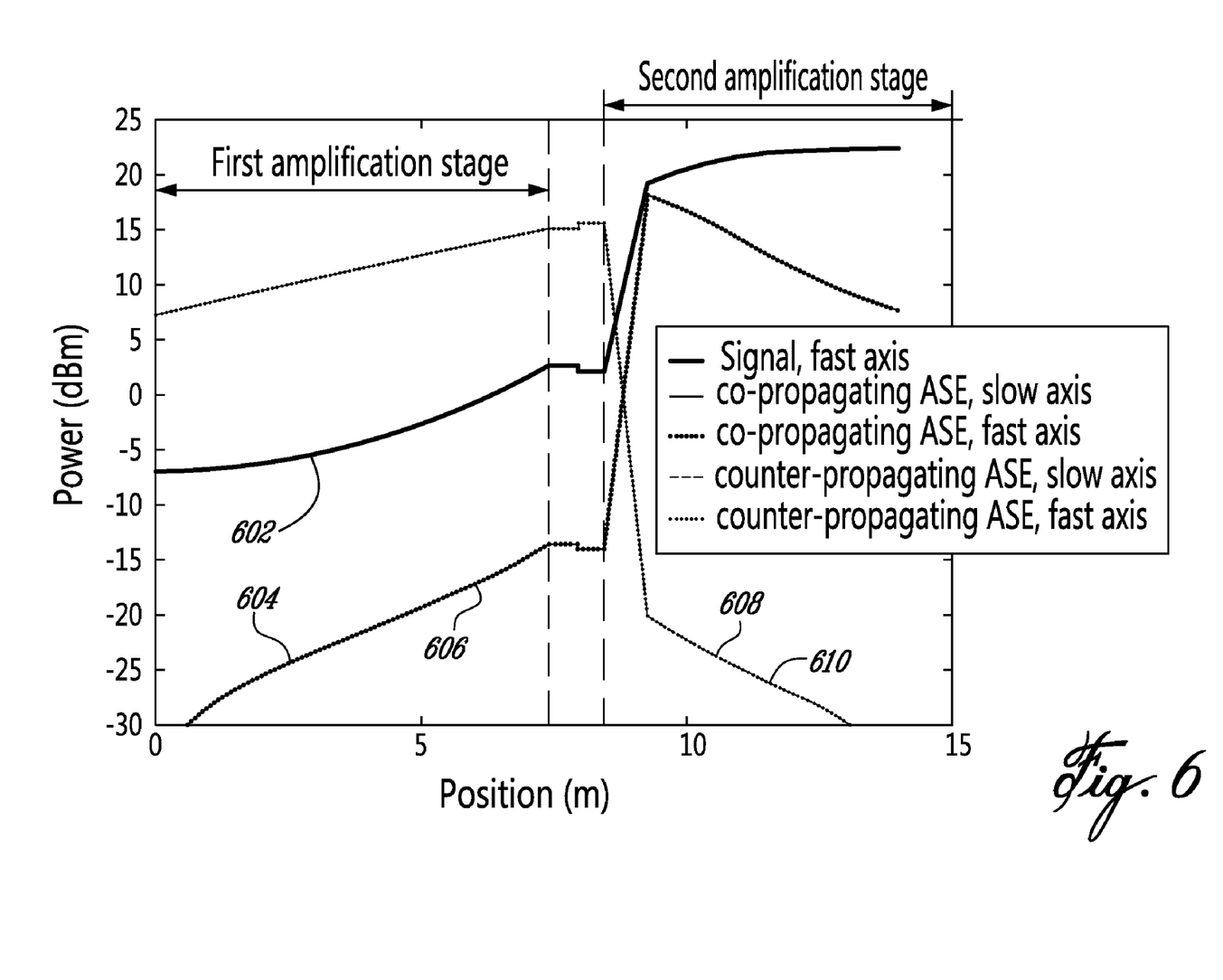
FIG. 6 is a graph showing the evolution of the optical power in the reference optical amplifier of FIG. 5.

FIG. 6 shows the evolution of the optical power in the reference optical amplifier 500 of FIG. 5. Trace 602 shows the evolution of the signal propagating along the fast axis, trace 604 shows the evolution of the co-propagating ASE along the slow axis, trace 606 shows the evolution of the co-propagating ASE along the fast axis, trace 608 shows the evolution of the counter-propagating ASE along the slow axis and trace 610 shows the evolution of the counter-propagating ASE along the fast axis. The overall gain of the reference optical amplifier 500 is 29.31 dB.

Figure 7:
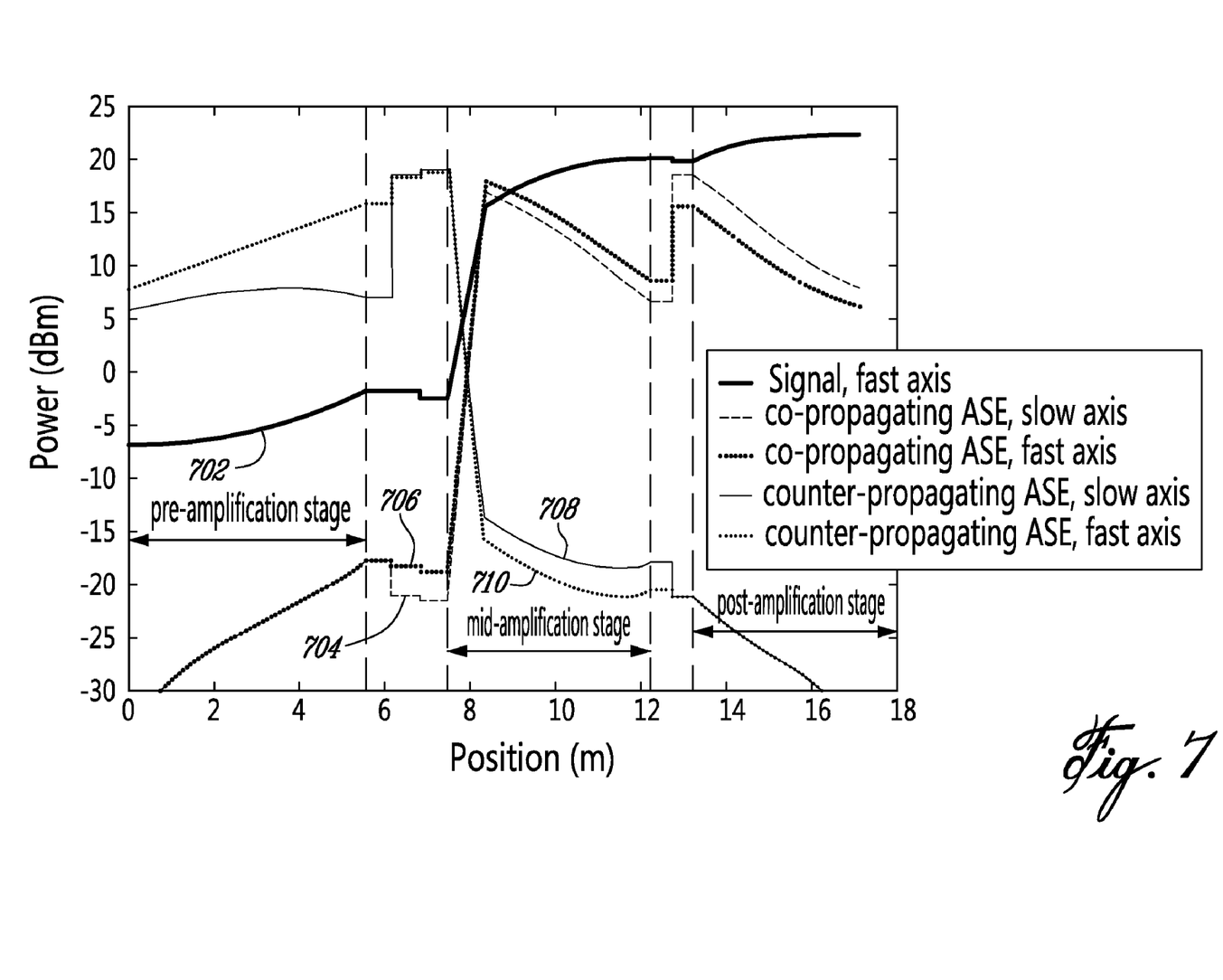
FIG. 7 is a graph showing the evolution of the optical power in the optical amplifier of FIG. 1.

FIG. 7 shows the evolution of the optical power in the optical amplifier 100 of FIG. 1. Trace 702 shows the evolution of the signal propagating along the fast axis, trace 704 shows the evolution of the co-propagating ASE along the slow axis, trace 706 shows the evolution of the co-propagating ASE along the fast axis, trace 708 shows the evolution of the counter-propagating ASE along the slow axis and trace 710 shows the evolution of the counter-propagating ASE along the fast axis. The overall gain of the optical amplifier 100 is 29.06 dB. It can be seen on FIGS. 6 and 7 that most of the ASE produced in the mid-amplification stage 120 is coupled to the post-amplification stage 30, while the remaining is coupled to the pre-amplification stage 10. The overall gain of the optical amplifier 100 is a bit lower than that of the optical amplifier 500. This is mostly due to the insertion loss of the coupler 44 which is 0.46 dB.

Figure 8:
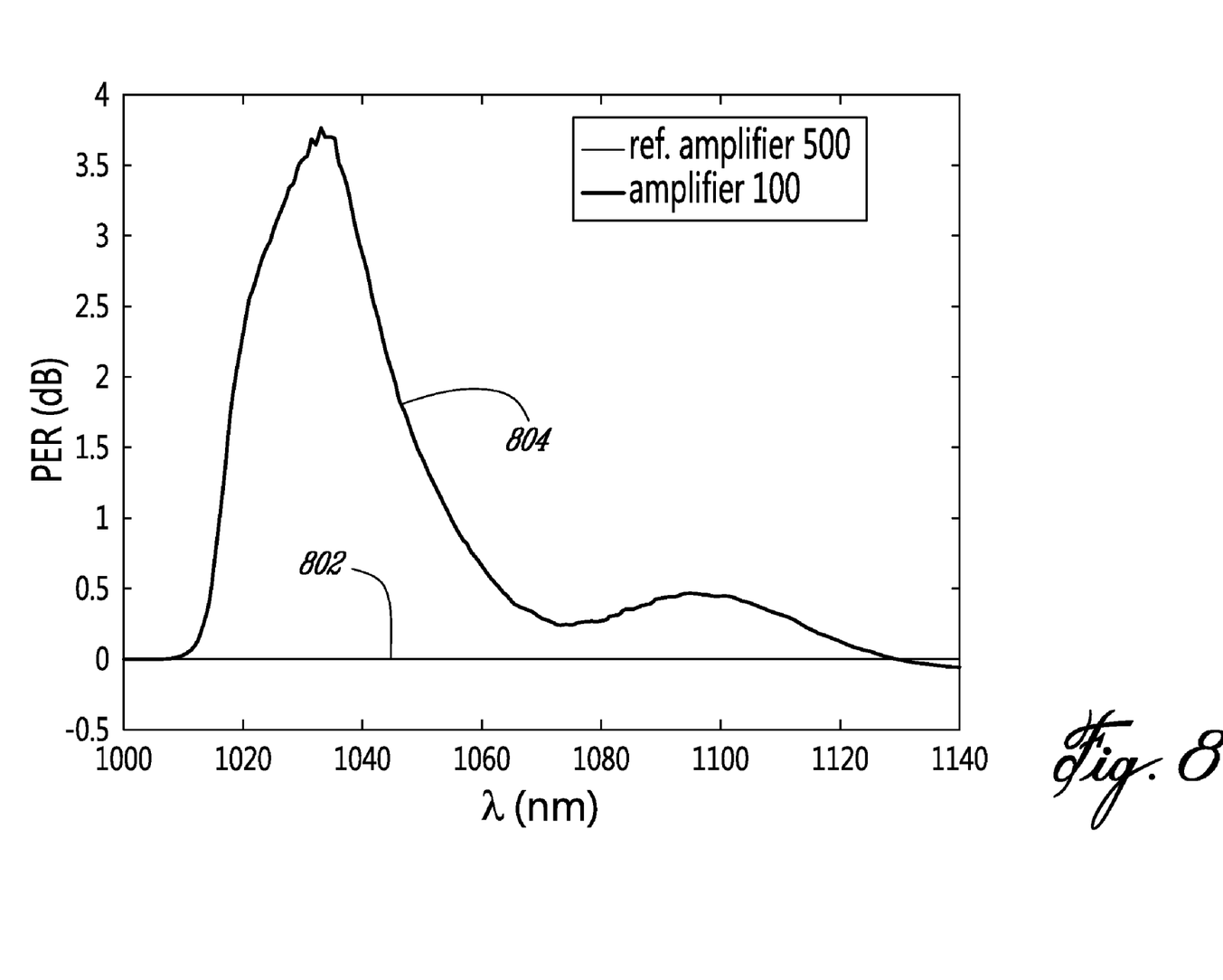
FIG. 8 is a graph showing the polarization extinction ratio of the ASE at the output of the optical amplifiers of FIGS. 1 and 5.

FIG. 8 shows the polarization extinction ratio of the slow axis over the fast axis, of the ASE at the output of the optical amplifiers 100 and 500 of FIGS. 1 and 5. Trace 802 shows the variation in wavelength of the polarization extinction ratio of the ASE in the reference optical amplifier 500 of FIG. 5, while trace 804 shows the polarization extinction ratio in the optical amplifier 100 of FIG. 1. It can be seen that, in the optical amplifier 100 of FIG. 1, most of the ASE at the output of the amplifier 100 is polarized along the slow axis. This ASE can be suppressed using the polarizer 46. For comparison, in the reference optical amplifier 500, the polarization extinction ratio of the ASE at the output is 0 dB over the entire wavelength range. This is due to the absence of any polarization selective component in the reference optical amplifier 500.

Figure 9:
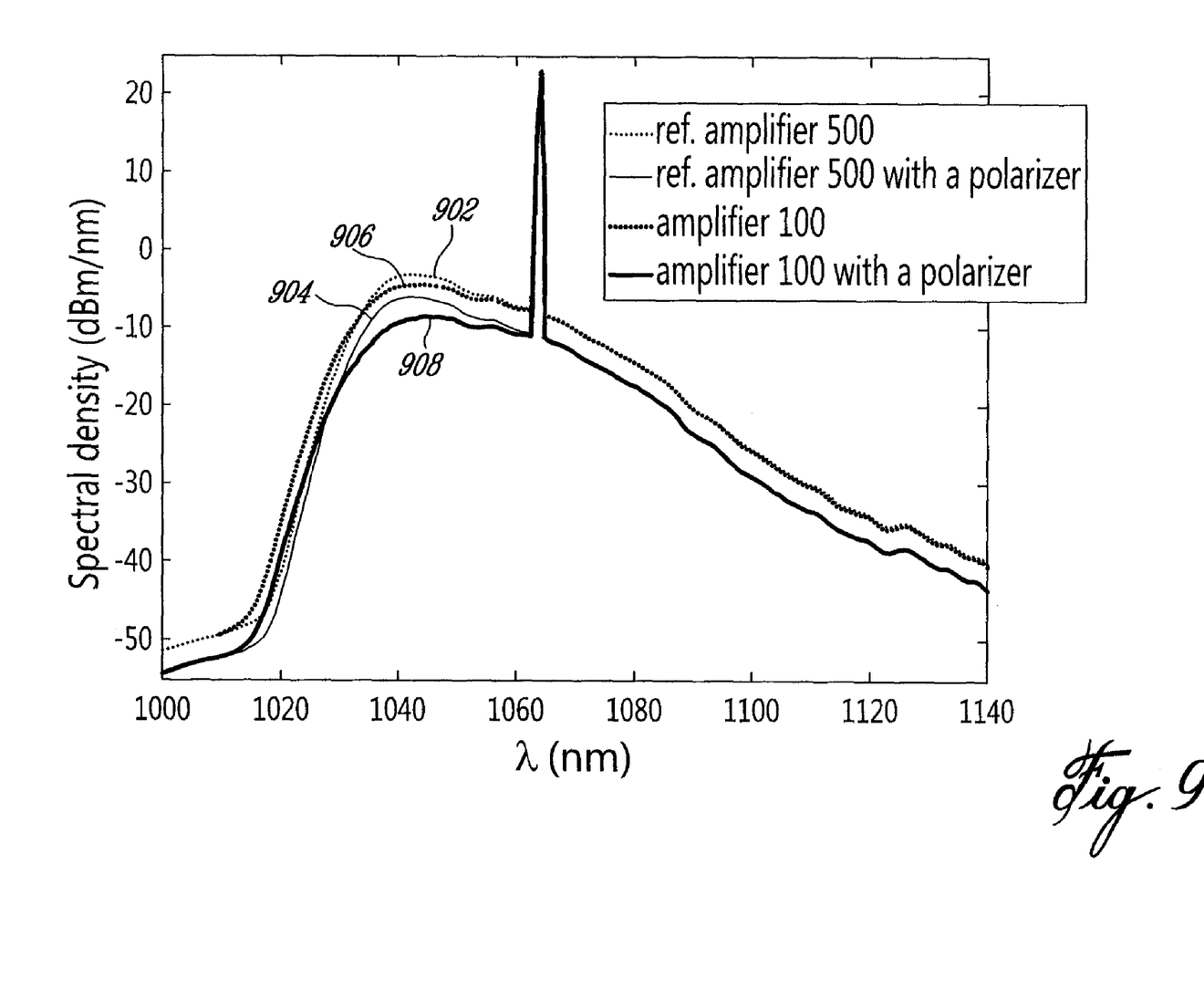
FIG. 9 is a graph showing the optical spectrum at the output of the optical amplifiers of FIGS. 1 and 5, with and without a polarizer.

FIG. 9 shows the optical spectrum at the output of the optical amplifiers 100 and 500 of FIGS. 1 and 5, with and without the use of a polarizer 46 at their output. The benefit of using the polarizer 46 can be observed. Trace 902 shows the optical spectrum at the output of the reference optical amplifier 500 without the polarizer 46. The signal to noise ratio is 11.67 dB. Trace 904 shows the optical spectrum at the output of the reference optical amplifier 500 with the polarizer 46. The signal to noise ratio is 14.68 dB, for an increase of 3.01 dB.

Trace 906 shows the optical spectrum at the output of the optical amplifier 100 without the polarizer 46. The signal to noise ratio is 12.13 dB. Trace 908 shows the optical spectrum at the output of the optical amplifier 100 with the polarizer 46. The signal to noise ratio is 16.05 dB, for an increase of 3.92 dB. The improvement in signal to noise ratio between the optical amplifier 100 of FIG. 1 and the reference optical amplifier 500 is of 1.37 dB when considering the use of the polarizer 46.

Figure 10:
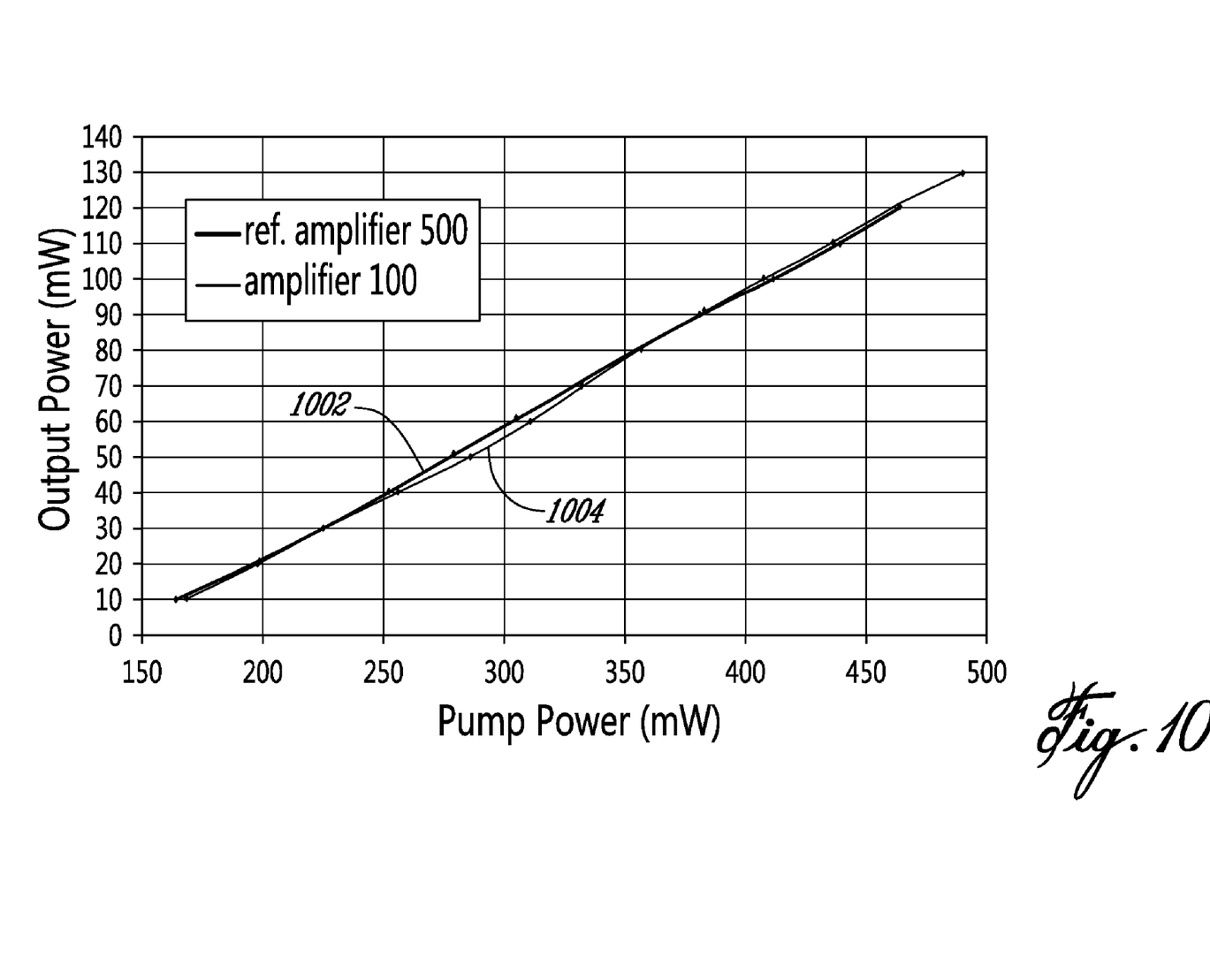
FIG. 10 is a graph showing an experimental result of the power at the output of the optical amplifiers of FIGS. 1 and 5 as a function of the pump power.
Figure 11:
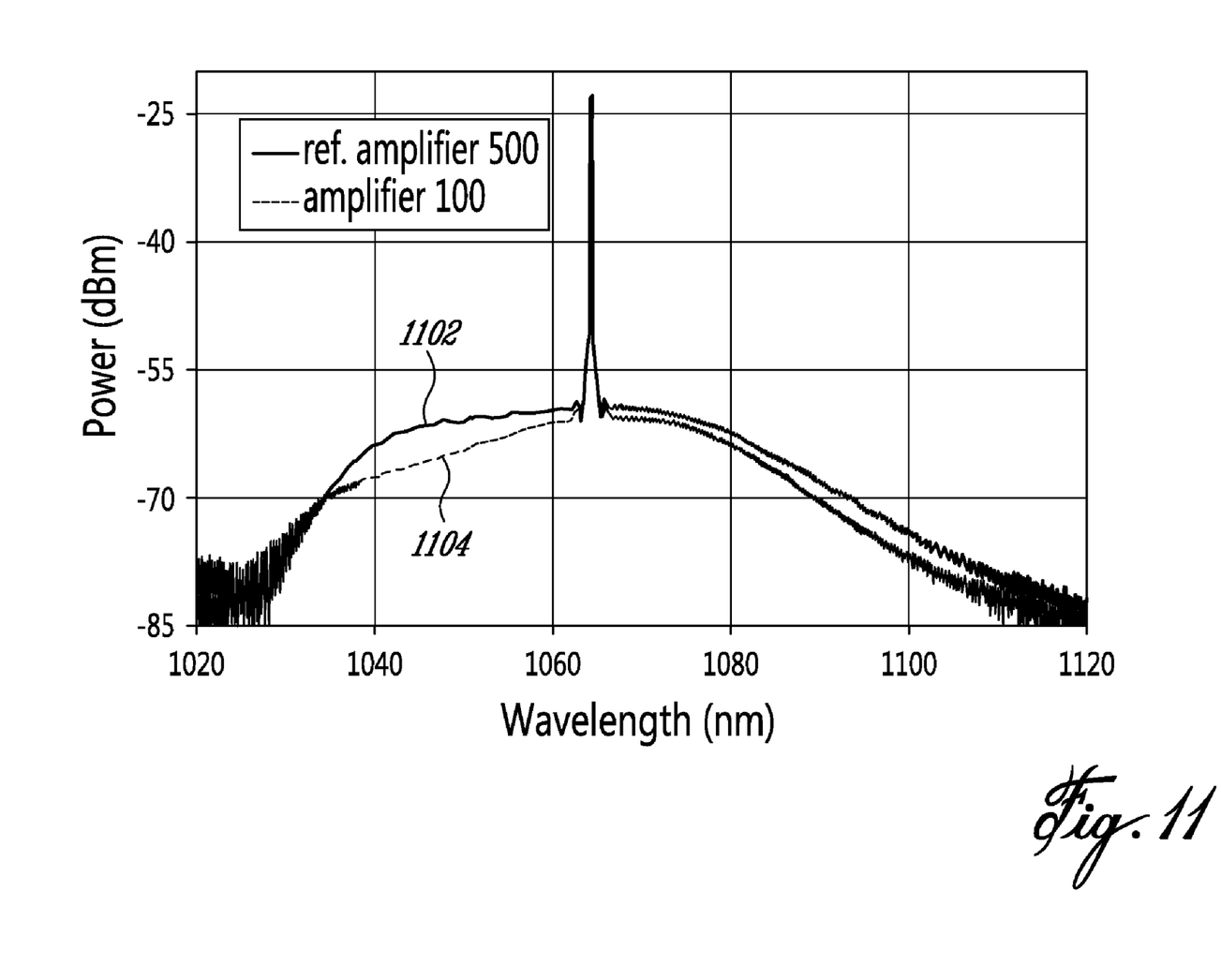
FIG. 11 is a graph showing an experimental result of the optical spectrum at the output of the optical amplifiers of FIGS. 1 and 5.

FIGS. 10 and 11 show experimental results obtained with the optical amplifiers 100 and 500 of FIGS. 1 and 5. It is noted that the results are in excellent agreement with the predictions made from the numerical simulations. FIG. 10 shows the power at the output of the optical amplifiers 100 and 500 as a function of the pump power. Trace 1002 shows the output power of the reference optical amplifier 500, while trace 1004 shows the output power of the optical amplifier 100. FIG. 11 shows the optical spectra at the output of the optical amplifiers 100 and 500. Trace 1102 shows the optical spectrum at the output of the reference optical amplifier 500, while trace 1104 shows the optical spectrum at the output of the optical amplifier 100. Essentially, what is shown by the experimental results is that the efficiency of the two architectures is comparable but that the ASE noise in the optical amplifier 100 is reduced compared to the reference optical amplifier 500.

Figure 12:
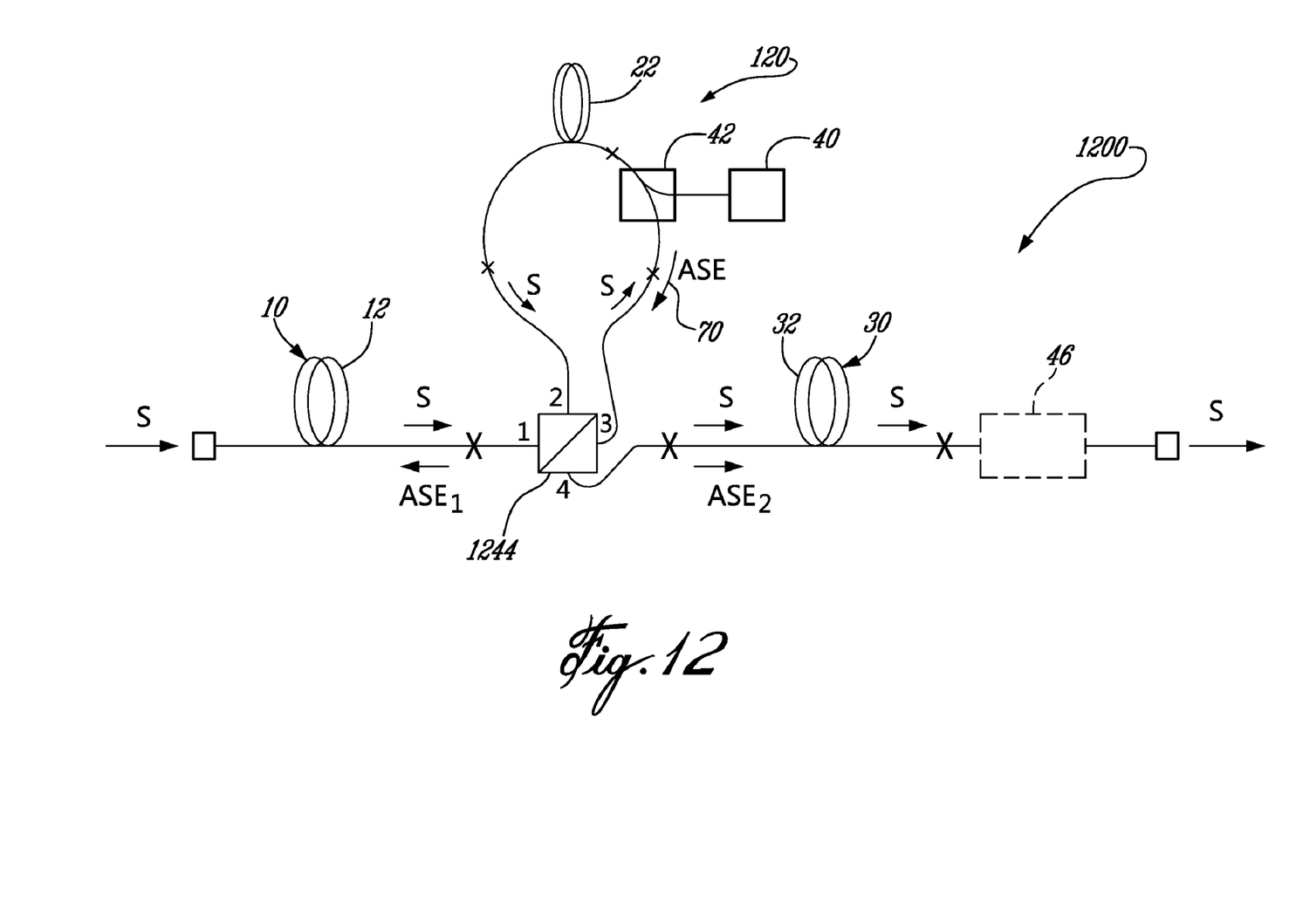
FIG. 12 is a block diagram illustrating yet another embodiment of a long-band optical amplifier wherein the polarization-maintaining fiber coupler is replaced by a bulk polarization beam combiner/splitter cube.

FIG. 12 shows yet another embodiment of a long-band optical fiber amplifier 1200 wherein the configuration of FIG.

1 is used but the polarization-maintaining fiber coupler 44 is replaced by a bulk polarization beam combiner/splitter cube 1244 that is fiber pigtailed on its four functional faces to provide ports 1, 2, 3 and 4. Port 1 and 3 correspond to two opposite faces of the cube, while ports 2 and 4 correspond to the two other opposite faces. The optical signal s received at port 1 is polarized along the p-polarization state of the polarization beam combiner/splitter cube. In this configuration, ASE generated in the mid-amplification stage 120 and received on port 3 of the polarization beam combiner/splitter cube is split 50/50 between port 1 and port 4, i.e. between the pre-amplification stage 10 and the post-amplification stage 30. ASE polarized along the s-polarization state is transmitted to the post-amplification stage 30 while ASE polarized along the p-polarization state is transmitted to the pre-amplification stage 10. Consequently, ASE coupled in co-propagation in the post-amplification stage 30 is mostly polarized along the slow propagation axis while the signal is polarized along the fast propagation axis, providing a high polarization extinction ratio of the ASE at the output of the optical amplifier. In this configuration, the use of the polarizer 46 therefore significantly improves the noise figure.

It is noted that the optical amplifier architectures described herein may be used to amplify continuous, modulated or pulsed optical signals. For example, the optical amplifiers described herein may be used in nanosecond pulsed laser sources or ultrashort pulsed laser sources.

It should be understood that while rare-earth-doped optical fibers are use in the illustrated embodiments, other types of optical waveguides may also be used. For example, planar rare-earth-doped waveguides may be used. Since planar waveguides are typically shorter, rare-earth dopant concentration may be increased to achieve a similar amplification gain.

It is also noted that the rare-earth-doped optical fibers 12, 22 and 32 may use different dopants and base materials. In the illustrated case, the amplification waveguides 12, 22 and 32 are ytterbium-doped silica optical fibers but it is noted that ytterbium-doped chalcogenide optical fibers may also be used and that the waveguide may include other dopants. The concentration of ytterbium may also vary. Furthermore, it is noted that ytterbium may be replaced by another rare-earth dopant, such as erbium for example, for long-band amplification of an optical signal at a different wavelength.

Increasing/reducing ytterbium concentration in the amplification waveguide may also be used to reduce/increase the length of the amplification waveguide.

Furthermore, in the illustrated case, a polarization combiner/splitter, e.g. a polarization-maintaining fiber coupler, is used to split the ASE power generated in the mid-stage among the pre- and the post-amplification stages. It is however noted that, if other means are used for splitting and coupling of the ASE power, the rare-earth-doped optical waveguides may not be necessarily polarization-maintaining and, similarly, the optical signal may not be polarized.

The embodiments described above are intended to be exemplary only. The scope of the invention is therefore intended to be limited solely by the appended claims.

What is claimed is:

1. A method for amplifying an optical signal in a long-band optical amplifier, the method comprising:
   propagating the optical signal in a first rare-earth-doped amplification waveguide;
   pumping said first rare-earth-doped amplification waveguide with a first part of amplified spontaneous emission to pre-amplify the optical signal propagating therein into a pre-amplified optical signal;
   propagating said pre-amplified optical signal in a second rare-earth-doped amplification waveguide;
   pumping said second rare-earth-doped amplification waveguide with a pump light source to amplify the pre-amplified optical signal propagating in the pumped second rare-earth-doped amplification waveguide into an amplified optical signal, said pumping generating amplified spontaneous emission in said second rare-earth-doped amplification waveguide;
   splitting said amplified spontaneous emission in at least said first part and a second part of amplified spontaneous emission;
   coupling said first part into said first rare-earth-doped amplification waveguide for said pumping said first rare-earth-doped amplification waveguide to pre-amplify the optical signal propagating therein; and
   coupling said amplified optical signal and said second part in a third rare-earth-doped amplification waveguide, said second part pumping said third rare-earth-doped amplification waveguide for post-amplification of said amplified optical signal.

2. The method as claimed in claim 1, further comprising providing said first, said second and said third rare-earth-doped amplification waveguides respectively as a first, a second and a third polarization-maintaining waveguides each having a first principal state of polarization and a second principal state of polarization, wherein said optical signal is polarized and wherein said optical signal is propagated along said first principal state of polarization.

3. The method as claimed in claim 2, wherein said coupling the pre-amplified optical signal, said splitting said amplified spontaneous emission, said coupling said first part and said coupling said amplified optical signal and said second part are made using at least one polarization splitter.

4. The method as claimed in claim 3, wherein said coupling the pre-amplified optical signal, said splitting said amplified spontaneous emission, said coupling said first part and said coupling said amplified optical signal and said second part are made using a polarization-maintaining fiber coupler.

5. The method as claimed in claim 1, wherein said pumping said second rare-earth-doped amplification waveguide comprises co-propagating said pump light with said pre-amplified optical signal in said second rare-earth-doped optical waveguide.

6. The method as claimed in claim 1, wherein said amplified spontaneous emission is generated in counter-propagation with said pre-amplified optical signal in said second rare-earth-doped optical waveguide.

7. An optical amplifier for amplifying an optical signal in a long-band of said optical amplifier, the optical amplifier comprising:
   a pre-amplification stage having a first rare-earth-doped amplification waveguide, the optical signal to be coupled at an input of said first rare-earth-doped amplification waveguide for pre-amplification of the optical signal;
   a mid-amplification stage having a second rare-earth-doped amplification waveguide pumped with a pump light source for mid-amplification of the optical signal, said mid-amplification generating amplified spontaneous emission in said second rare-earth-doped amplification waveguide;
   a post-amplification stage having a third rare-earth-doped amplification waveguide for post-amplification of the optical signal; and
   an optical coupling device connected between said pre-amplification stage, said mid-amplification stage and said post-amplification stage for coupling the optical signal received from said pre-amplification stage to said mid-amplification stage, and from said mid-amplification stage to said post-amplification stage, said optical coupling device receiving said amplified spontaneous emission from said mid-amplification stage, and splitting it in a first and a second part such that said first part is coupled to said pre-amplification stage for pumping said pre-amplification stage, and said second part is coupled to said post-amplification stage for pumping said post-amplification stage.

8. The optical amplifier as claimed in claim 7, wherein said first, second and third rare-earth-doped amplification waveguides are polarization-maintaining waveguides each having a first principal state of polarization and a second principal state of polarization.

9. The optical amplifier as claimed in claim 8, wherein said optical signal is polarized and wherein said optical signal is propagated along said first principal state of polarization.

10. The optical amplifier as claimed in claim 9, wherein said optical coupling device comprises at least one polarization splitter.

11. The optical amplifier as claimed in claim 10, wherein said at least one polarization splitter comprises a polarization-maintaining fiber coupler.

12. The optical amplifier as claimed in claim 9, further comprising a polarizer located at an output of said post-amplification stage and aligned to said first principal state of polarization.

13. The optical amplifier as claimed in claim 7, wherein a pump light provided by said pump light source is co-propagated with said optical signal in said second rare-earth-doped optical waveguide.

14. The optical amplifier as claimed in claim 13, wherein said amplified spontaneous emission is generated in counter-propagation with said optical signal in said second rare-earth-doped optical waveguide.

15. The optical amplifier as claimed in claim 7, wherein said first, said second and said third rare-earth-doped optical waveguides are ytterbium-doped.

16. The optical amplifier as claimed in claim 15, wherein a value of a peak wavelength of said optical signal is of at least 1064 nanometers.

17. The optical amplifier as claimed in claim 7, said first, said second and said third rare-earth-doped optical waveguides are optical fibers.

18. The optical amplifier as claimed in claim 17, wherein said first, second and third rare-earth-doped amplification waveguides are polarization-maintaining optical fibers each having a first principal state of polarization and a second principal state of polarization, wherein said optical signal is polarized and propagated along said first principal state of polarization, and wherein said optical coupling device comprises a polarization-maintaining fiber coupler.

19. An optical amplifier for amplifying an optical signal in a long-band of said optical amplifier, the optical amplifier comprising:
a pre-amplification stage having a first rare-earth-doped amplification waveguide, the optical signal to be coupled at an input of said first rare-earth-doped amplification waveguide for pre-amplification of the optical signal;
a mid-amplification stage having a second rare-earth-doped amplification waveguide pumped with a pump light source for mid-amplification of the optical signal, said mid-amplification generating amplified spontaneous emission in said second rare-earth-doped amplification waveguide;
a post-amplification stage having a third rare-earth-doped amplification waveguide for post-amplification of the optical signal; and
an optical coupling device for coupling said pre-, mid- and post-amplification stages and having (1) a first port connected to an output of said pre-amplification stage and a third port connected to an input of said mid-amplification stage for coupling the optical signal received from said pre-amplification stage to said mid-amplification stage, and (2) a second port connected to an output of said mid-amplification stage and a fourth port connected to an input of said post-amplification stage for coupling the optical received from said mid-amplification stage to said post-amplification stage; (3) said optical coupling device interconnecting said first, second, third and fourth ports so as to split said amplified spontaneous emission received on at least one of said second and said third port, in a first and a second part respectively to said first and said fourth port, such that said first part is coupled to said pre-amplification stage for pumping said pre-amplification stage, and said second part is coupled to said post-amplification stage for pumping said post-amplification stage.

20. The optical amplifier as claimed in claim 19, wherein said amplified spontaneous emission is generated in counter-propagation with said optical signal in said second rare-earth-doped optical waveguide and is received on said third port.

* * * * *